May 28, 1968     N. H. REINERS ETAL     3,385,276
FUEL SUPPLY APPARATUS
Filed Oct. 7, 1965     6 Sheets-Sheet 1
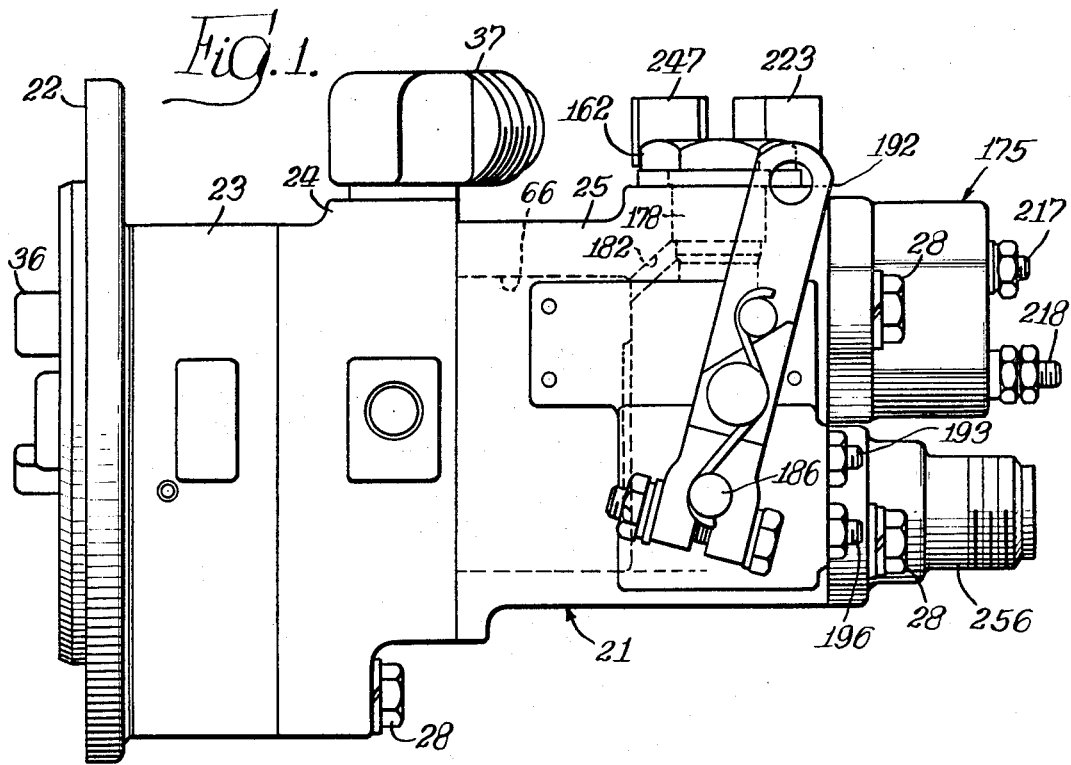
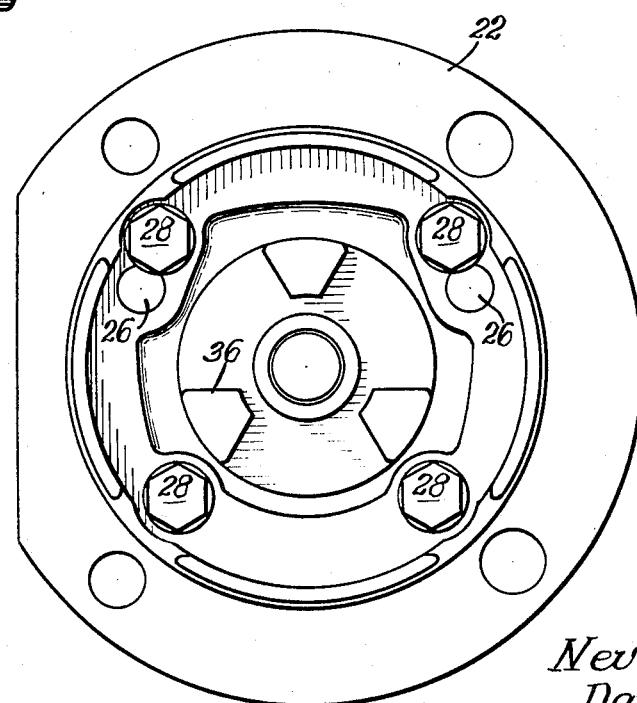
Inventors:—
Neville H. Reiners,
David T. Marks,
Edward D. Smith,
By Hibben, Noyes & Bicknell Attys.

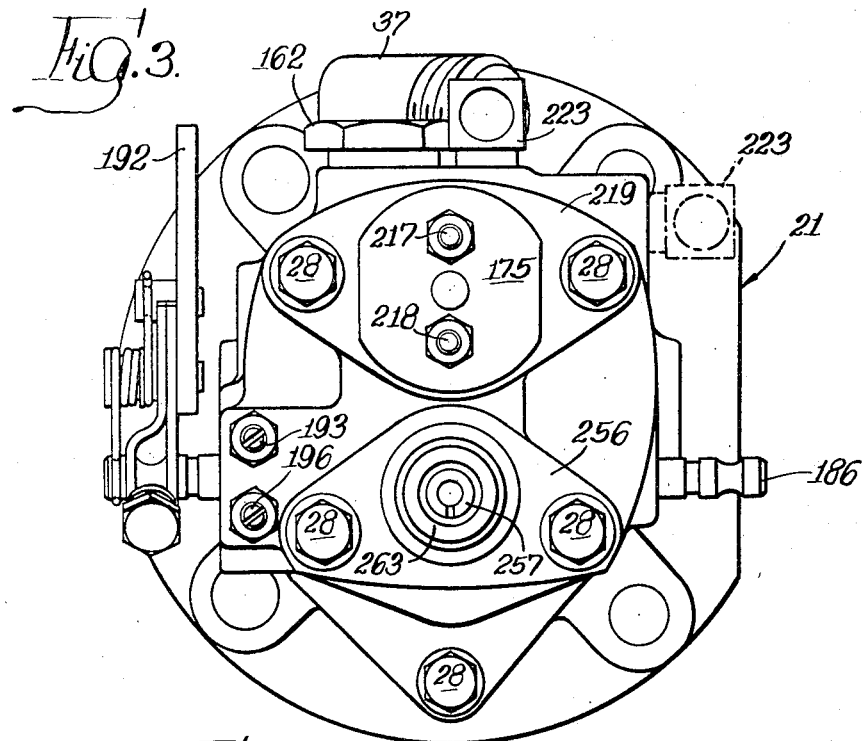
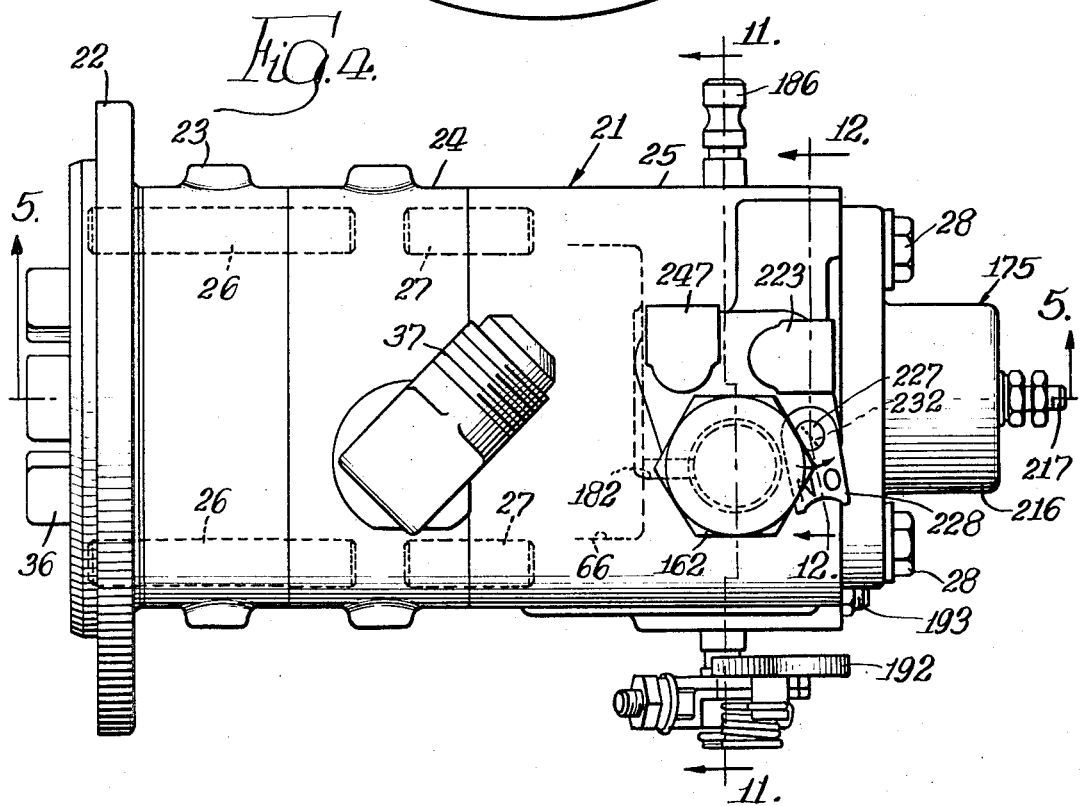

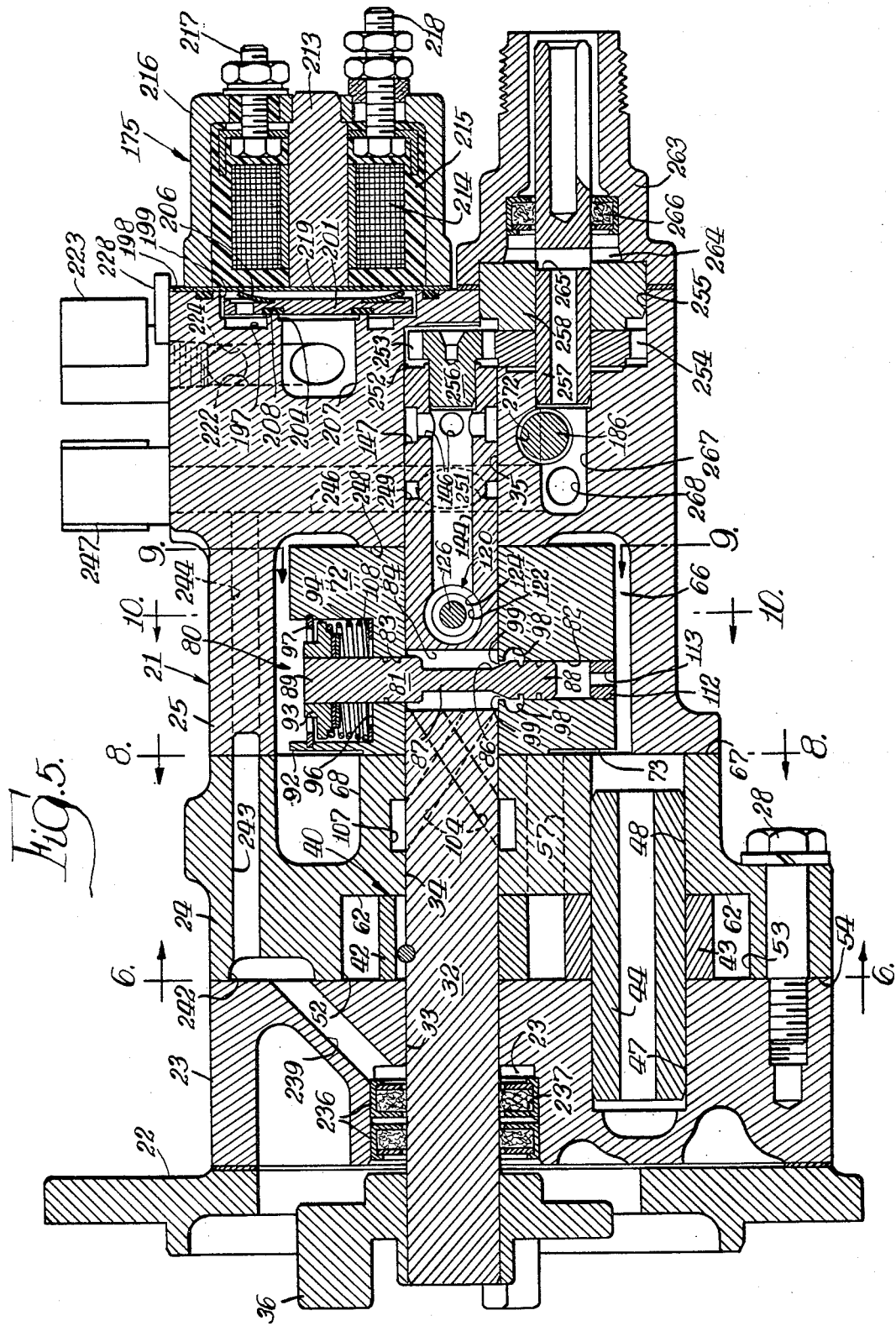

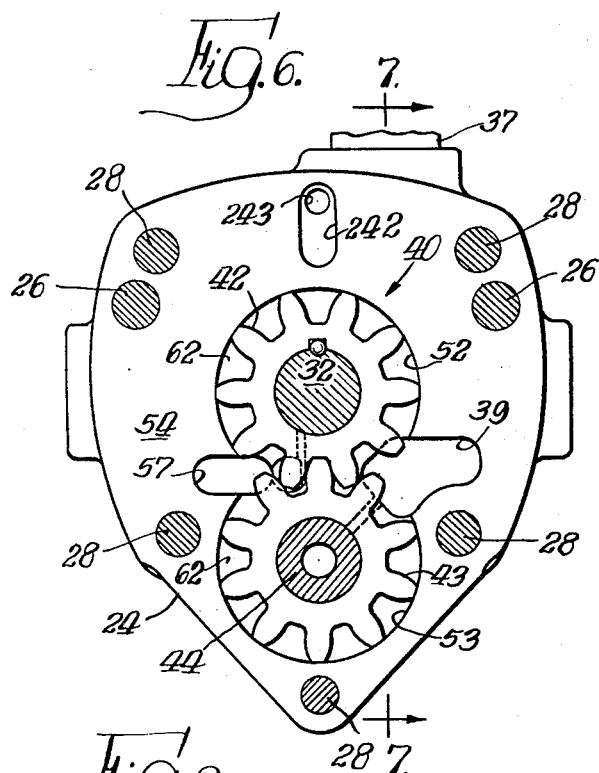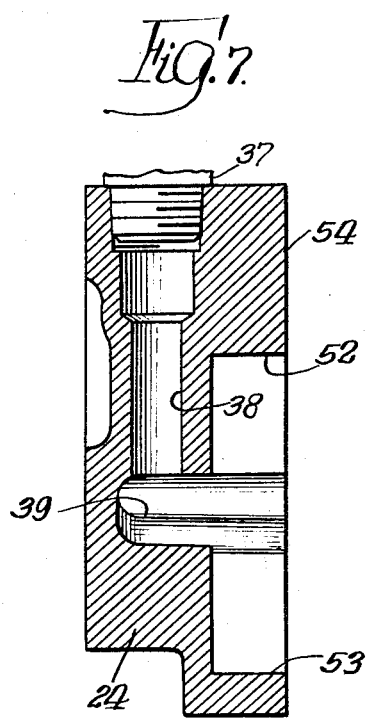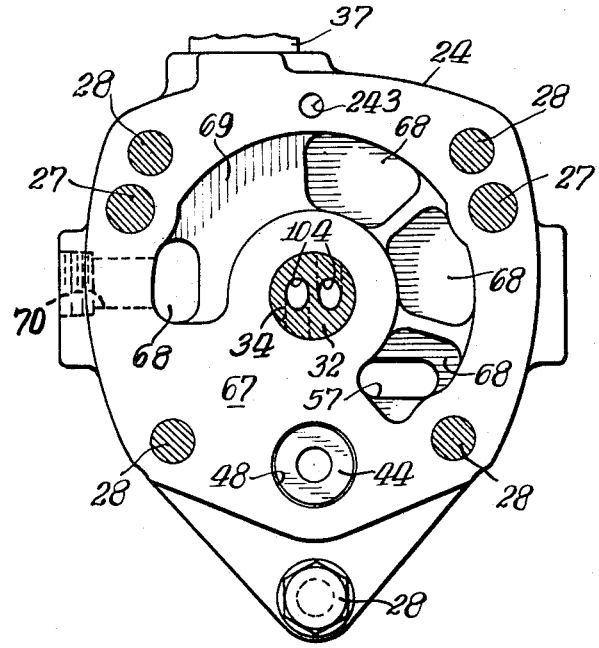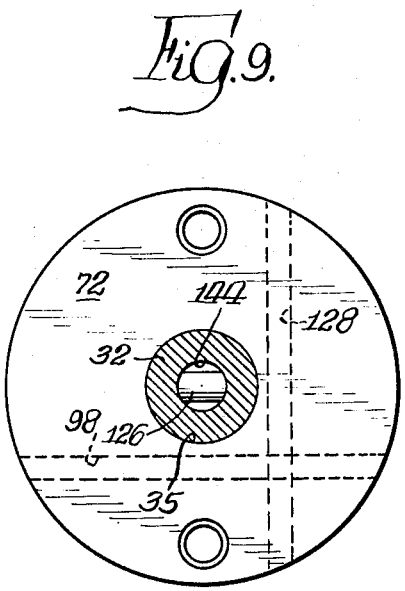

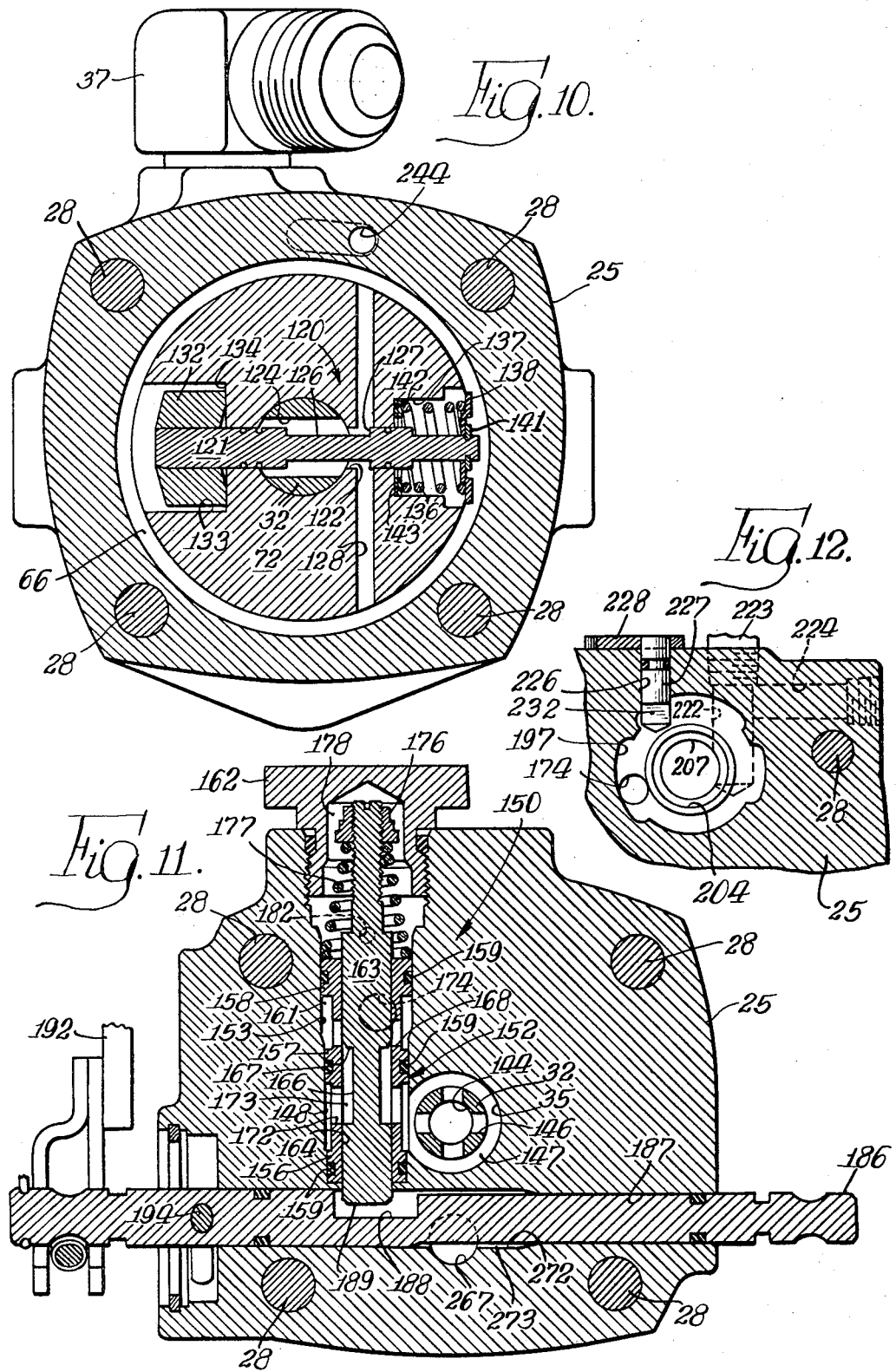

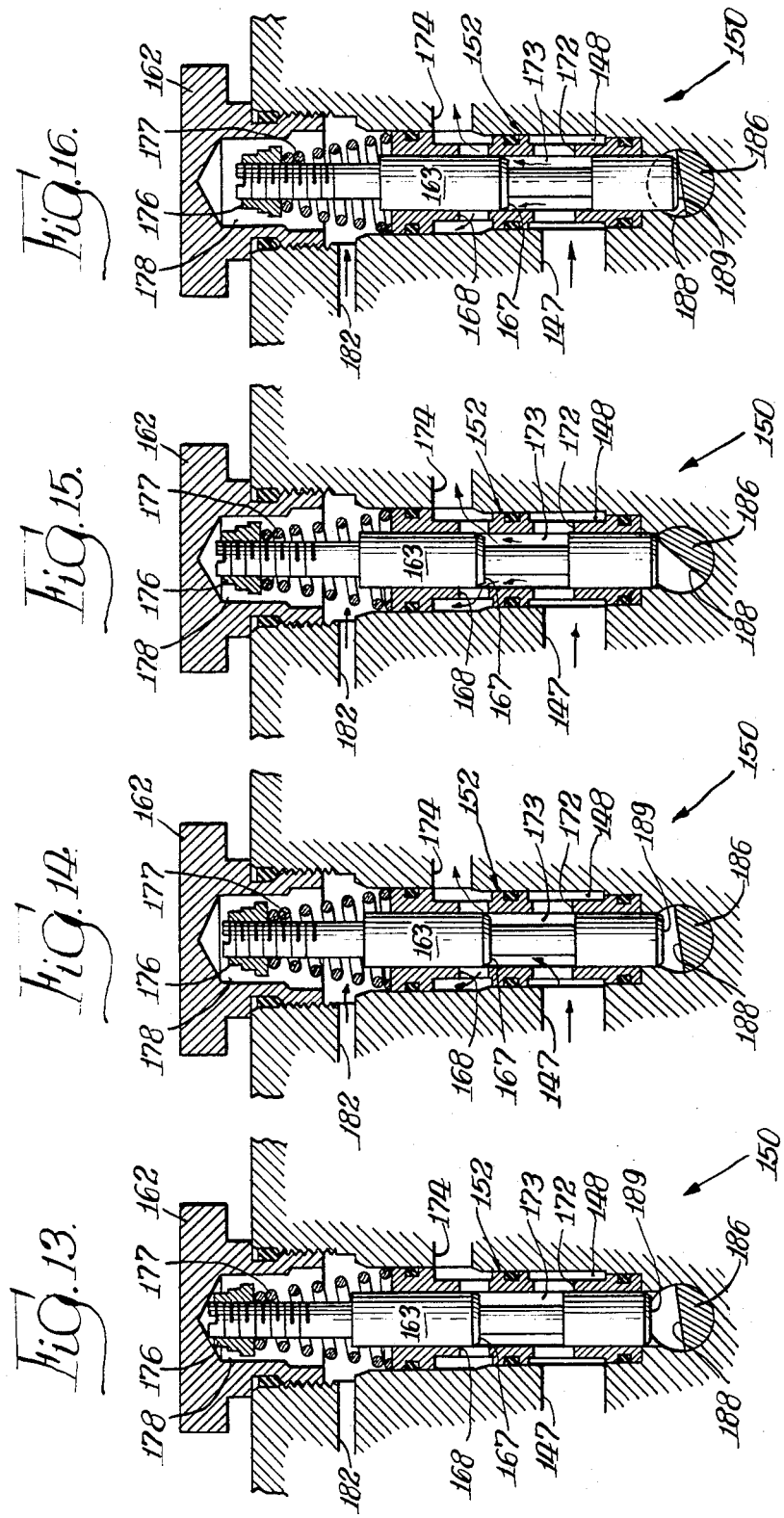

United States Patent Office 3,385,276
Patented May 28, 1968

3,385,276
FUEL SUPPLY APPARATUS
Neville H. Reiners, David T. Marks, and Edward D. Smith, Columbus, Ind., assignors to Cummins Engine Company, Inc., Columbus, Ind., a corporation of Indiana
Filed Oct. 7, 1965, Ser. No. 493,656
37 Claims. (Cl. 123—140)

ABSTRACT OF THE DISCLOSURE

This apparatus includes an engine-driven fuel pump and a novel engine-driven pressure regulator responsive to the pressure of the fuel discharge by the fuel pump and to the speed of the engine for regulating the pressure of the fuel furnished to the engine. A novel maximum speed governor responsive to engine speed is provided for restricting the flow of fuel from the pump to the engine above a preselected high engine speed. A novel, manually actuated, fuel flow control valve or throttle valve which, when the manual actuator for the valve is in the closed or idle position, is responsive to the upstream pressure of the pumped fuel and to resilient biasing means to control the flow of fuel to the engine.

This invention relates generally to a fuel supply apparatus for an internal combustion engine and more particularly relates to a fuel supply apparatus for an internal combustion engine of the diesel type.

It is a general object of the present invention to provide a novel fuel supply apparatus for accurately controlling fuel flow to the injectors of an internal combustion engine of the diesel type.

Another object is to provide a novel fuel supply apparatus of the foregoing character having separately adjustable pressure regulating means, maximum speed governing means and idle speed governing means.

Still another object is to provide a novel fuel supply apparatus of the foregoing character in which the pressure regulating and maximum speed governing means are controlled by centrifugal forces but do not utilize conventional flyball weights.

Another object is to provide a novel fuel supply apparatus for supplying fuel to the injectors of a compression-ignition engine, which is capable of being constructed to provide for substantially any desired torque delivery from the engine as a function of engine speed.

More specifically, it is an object to provide a novel fuel supply apparatus for controlling the pressure of the fuel where the engine torque is a function of the pressure at which fuel is delivered from the fuel supply apparatus to the injectors of the engine, said apparatus being capable of being constructed to provide fuel delivery pressures varying from an almost constant pressure throughout the speed range of the engine to a pressure which is an exponential function of such speed.

Still another object of the invention is to provide a novel fuel supply apparatus for an internal combustion engine of the diesel type, which apparatus requires a minimum of power to drive it, which is capable of operation at high engine speeds, and which does not excessively heat the fuel.

A further object is to provide a novel fuel supply apparatus which is compact in size, light in weight, and has a reduced number of parts.

A further object is to provide a novel fuel supply apparatus of the foregoing character which is simple in construction, easy to adjust and service in the field, reliable in operation, and economical to manufacture and maintain.

Other objects and advantages will become apparent from the following description taken in connection with the accompanying drawings, in which:

FIG. 1 is a side elevational view of a fuel supply apparatus embodying the features of the invention;

FIGS. 2 and 3 are end elevational views respectively of the left and right ends of the apparatus as viewed in FIG. 1;

FIG. 4 is a top plan view of the apparatus as viewed in FIG. 1;

FIG. 5 is a somewhat enlarged sectional view taken on the line 5—5 of FIG. 4;

FIG. 6 is a vertical sectional view on the same scale as FIG. 1 and taken on the line 6—6 of FIG. 5;

FIG. 7 is a fragmentary sectional view taken on the line 7—7 of FIG. 6 with certain parts omitted;

FIG. 8 is a sectional view on the same scale as FIG. 6 taken on the line 8—8 of FIG. 5;

FIGS. 9 and 10 are sectional views taken on the lines 9—9 and 10—10, respectively, of FIG. 5;

FIG. 11 is a somewhat enlarged sectional view taken substantially on the line 11—11 of FIG. 4;

FIG. 12 is a fragmentary sectional view taken on the line 12—12 of FIG. 4; and

FIGS. 13, 14, 15 and 16 are a series of semi-diagrammatic fragmentary sectional views of a portion of the fuel supply apparatus shown in FIG. 11 and showing the position of the parts thereof under the varying operating conditions.

The primary purpose of the fuel supply apparatus or unit disclosed herein is to deliver an accurately controlled flow of fuel, by control of the pressure of the fuel, to the injectors of an internal combustion engine of the diesel type under varying load and speed conditions. To this end, the apparatus includes a housing having a fuel passage therethrough, one end of which is adapted to be supplied with fuel from a reservoir or tank by a positive displacement pump. The other end of the passage is adapted to be connected to the injectors of the engine. Rotatably mounted in the housing is an engine driven member having a hub disposed in a cavity in the housing and forming a part of said passage, and centrifugally responsive pressure regulating means and maximum speed governing means are mounted in the hub. Throttle means are also mounted in the housing to control the flow of fuel to the engine.

The pressure regulating means includes a bypass for withdrawing fuel from the cavity. In this instance, the bypass connects the cavity with the inlet side of the pump, and is effective to control the pressure of the fuel supplied to the injectors of the engine throughout the entire operating range thereof by varying the fuel flow through the bypass.

The maximum speed governing means is effective to restrict the flow of fuel to the engine when the latter reaches a predetermined maximum speed.

The pressure regulating means and maximum speed governing means are separate units which may be individually adjusted, and, because these units are surrounded by and receive fuel under pressure from the cavity, a more stable regulation of the fuel flow is obtained. In addition, because the pressure regulating means and maximum speed governing means are mounted in the rotatable hub of the engine driven member, the customary flyball weights usually associated with devices of this type are eliminated. The foregoing construction, together with other structural features, make possible a reduction in the overall size, weight and number of parts in the unit.

The present fuel supply apparatus or unit also includes novel throttle means for controlling the fuel supplied to the injectors of the engine throughout the operating speed range thereof including idle. The throttle means thus includes a shiftable plunger which functions as an idle governor at idle speeds and as a manually controlled throttle at speeds above idle. When functioning as an idle speed governor, the position of the plunger is controlled by the counteracting forces of an idle speed governing spring and the pressure of fuel in the cavity of the housing. The idle speed governor of the throttle means is thus also free of flyball weights and the force exerted by the idle speed spring is adjustable to permit adjustment of the idle speed of the engine.

For controlling the position of the plunger, and consequently the flow of fuel to the engine at speeds above idle, the plunger includes a manually controlled throttle control member.

In the drawings, a fuel supply apparatus or unit embodying the features of the present invention, is illustrated. Such a fuel supply apparatus or unit comprises a multiple section housing 21 including a mounting or end section 22, in the form of a flange, at the left end of the housing as viewed in FIGS. 1, 4 and 5, intermediate sections 23 and 24, and an end section 25 at the right end of the unit. The end section 22 and intermediate sections 23 and 24 are maintained in axial alignment by dowel pins 26 (FIGS. 2, 4 and 6) and the intermediate and end sections 24 and 25 are maintained in axial alignment by another set of dowel pins 27 (FIGS. 4 and 8). Cap screws 28 maintain the various housing sections in abutting engagement.

An engine driven member in the form of a shaft 32 is rotatably monuted in a series of coaxial bores 33, 34 and 35, in the housing sections 23, 24 and 25, respectively, and a drive member or coupling 36 may be secured to the outer or left end of the shaft 32 as viewed in FIGS. 1, 4 and 5 for transmitting power thereto. In the present instance, the coupling 36 is connected to and driven by the engine.

Fuel is supplied to the unit by pump means which, in this instance, is mounted in the housing section 24. Thus, fuel from a tank (not shown) is drawn through an inlet fitting 37 (FIGS. 1, 3, 4 and 7) threaded into the upper end of a vertical bore 38 (FIG. 7) in the housing section 24. The lower end of the bore 38 intersects one end of a cored axially extending chamber 39 (FIGS. 6 and 7) communicating with the inlet or low pressure side of the pump means, which in this instance is of the positive displacement type comprising a gear pump 40.

The gear pump 40 includes a drive gear 42 mounted on and driven by the shaft 32, and a driven gear 43 mounted on a tubular stub shaft 44 disposed below the shaft 32 and rotatably journalled at its ends in coaxial bores 47 and 48 in the housing sections 23 and 24, respectively. The gears 42 and 43 are disposed in intersecting cylindrical recesses 52 and 53 in the outer or left end face, indicated at 54, of the housing section 24. Discharge of fuel from the pump is through an outlet provided by an axially extending flattened passage 57 (FIGS. 5, 6 and 8) in the housing section 24, which intersects the cylindrical gear recesses 52 and 53 at the high pressure side thereof. Provision is made for lubrication of the inner and outer end faces of the gears 42 and 43, as well as the portions of the shaft 32 in the housing sections 23 and 24, from the high pressure side of the pump.

Thus, upon counterclockwise rotation of the shaft 32 as viewed in FIG. 6, fuel is drawn into the inlet chamber 39 and carried by the gears to the outlet passage 57. The passage 57 thus receives a continuous flow of fuel from the pump 40 at a rate proportional to the speed of the engine since the shaft 32 is driven thereby.

Fuel from the pump 40 flows axially through the passage 57 toward an enlarged cylindrical cavity or recess 66 in the housing section 25. The inner or right face of the housing section 24, indicated at 67 in FIGS. 5 and 8, is provided with an arcuate series of weight reducing pockets or recesses 68 which communicate with the cavity 66 and thus comprise a portion thereof. The pockets 68 at the left end of the arcuate series as viewed in FIG. 8 is separated from the other pockets 68 by a shallow channel 69 which avoids breaking into the inlet bore 38. Extending from the left end pocket 68 is a tapped bore 70 to provide a gauge connection for indicating the pressure of the fuel delivered by the pump 40.

The shaft 32 extends through the cavity 66 and an enlarged cylindrical hub 72 is secured thereto and disposed within the cavity 66. The left end face of the hub 72 as viewed in FIG. 5, is annularly recessed as at 73 to provide clearance at the periphery of the hub between the end face thereof and the adjacent end face 67 of the housing section 24 to facilitate fuel flow from the passage 57 into the cavity 66.

According to the present invention, the hub 72 includes novel pressure regulating means in the form of a pressure regulator 80 for controlling the pressure of the fuel in the cavity 66 and consequently the pressure of the fuel in the various portions of the fuel passage from the pump 40 to the injectors of the engine. The pressure regulator 80 preferably comprises a plunger 81 which is shiftably mounted in a diametric or transversely extending bore in the hub 72 and shaft 32 for radial movement relative to the axis of rotation thereof. The transverse bore at its ends is open to cavity 66 and includes a portion 82 on one side of the shaft 32, a portion 83 of somewhat larger diameter on the opposite side thereof, the portions 82 and 83 being in the hub 72, and a portion 84 in the shaft 32. The plunger 81 has a reduced diameter portion 87 defining radially spaced end portions 88 and 89 and an annular tapered shoulder 86 adjacent the end portion 88. The end portions 88 and 89 closely fit the portions 82 and 83 of the transverse bore in pressure sealed relation.

The outer end of the larger transverse bore portion 83 is counterbored as at 92 to accommodate a weight 93 secured to the outer end 89 of the plunger 81. The weight 93 serves to increase the centrifugal force tending to shift the plunger 81 in the direction of its larger end portion 89 and also serves as an abutment for one end of a coil spring 94. The other end of the coil spring 94 bears against an annular shoulder 96 defined by the inner end of the counterbore 92. A snap ring 97 is seated in a groove near the outer end of the counterbore 92 to limit radially outward movement of the weight 93 and plunger 81. Thus, the position of the plunger 81 in its transverse bore depends upon the force exerted on the plunger due to the pressure of the fuel acting on the differential area between the larger end portion 89 and smaller end portion 88. This force tends to shift the plunger toward its smaller end and is opposed by the centrifugal force of the weight 93 and the difference in weight between the two end portions of the plunger 81 and by the force of the spring 94.

In ordr that the pressure regulator 80 perform its function, the latter includes a bypass for dischaging some of the fuel to the inlet side of the pump 40. To this end, a duct in the form of a pair of axially spaced bores 98 (FIGS. 5 and 9) extends transversely of the axis of the plunger bore 82, 83 and intersects the smaller portion 82 thereof. The radial outer ends of the bores 98 communicate with the cavity 66 and thus provide inlets for the bypassed fuel.

Fuel being bypassed flows radially inward in the bores 98 and then through a pair of control ports 99 defined by the intersection of the bores 98 with the portion 82 of the transverse bore. The tapered shoulder 86 on the plunger 81 varies the effective size of the ports 99 on movement of the plunger. From the ports 99, fuel flows to an annular space provided by the portion 84 of the plunger bore and the reduced diameter portion 87 of the plunger 81. From such annular space the bypassed fuel enters the inner ends of a pair of transversely spaced, diagonally extending bores 104 (FIGS. 5 and 8) in the shaft 32 and then flows through the bores 104 to an annular recess 107 in the housing section 24 and opening into the shaft bore 34. The recess 107 is in radial alignment with the outer ends of the diagonal bores 104 and is of sufficient radial depth to intersect the vertical inlet bore 38 for the pump 40.

Thus, the amount of fuel bypassed by the pressure regulator 80 and consequently the pressure of the fuel in the cavity 66 depends upon the effective size of the control ports 99, which is determined by the position of the plunger 81 in its bore. The position of the plunger in its bore depends upon an equilibrium condition between the forces acting thereon, namely; (1) the force developed by the pressure of the fuel in the cavity 66 acting on the differential area between the smaller end portion 88 and larger end portion 89 of the plunger 81; (2) the centrifugal force of the weight 93 and the difference in weight of the two end portions of the plunger 81; and (3) the force of the spring 94. Because the pressure regulator 80 is mounted in the hub 72 which rotates with the engine driven shaft 32, the centrifugal force mentioned above will vary as a function of the speed of the engine.

From the foregoing it will be apparent that the position of the plunger 81 in its bore and consequently the amount of fuel bypassed for a given engine speed may be changed by varying any one or all of the enumerated factors, but preferably by a change in the force exerted by the spring 94, as by adding or removing shims 108 (FIG. 5) between the inner end of the spring 94 and the shoulder 96.

In order to dampen movements of the plunger 81 and to reduce fluttering thereof, orifice means in the form of a plug 112 having an orifice opening 113 therein is pressed into the smaller portion 82 of the transverse plunger bore for restricting fuel flow into and out of the portion 82 of the plunger bore.

From the foregoing it will be evident that the pressure regulator 80 is capable of controlling the pressure of the fuel in the cavity 66 within broad limits and thus also the pressure of the fuel supplied to the injectors of the engine. Since the power developed by the engine depends primarily on the amount of fuel injected into the cylinders, control of the pressure of the fuel in the cavity 66 provides a direct and precise control of engine torque at a given rotational speed. The ability of a fuel supply apparatus or system to regulate the torque or power developed by the engine at various rotational speeds may be termed the "torque curve shaping" ability of the apparatus or system.

The components of the pressure regulator 80 affect the torque curve of the engine in the following manner. If the spring 94 of the pressure regulator 80 were omitted, the construction otherwise remaining the same, the pressure of fuel in the cavity 66 would be governed by the centrifugal force of the weight 93. This force varies as a quadratic or square function of the speed of rotation of the hub 72 and thus the speed of rotation of the engine which drives the hub 72. With such an arrangement, the amount of fuel injected in the cylinders remains nearly constant per cycle, irrespective of engine speed and the position of the plunger 81 will remain fixed within the hub 72. The resulting torque curve would be nearly flat but slowly rising with increasing engine speeds, until at higher engine speeds, the torque curve tends to level out and fall off, due to lower efficiencies of air induction or breathing and increased friction losses.

If the weight 93 of the pressure regulator 80 were omitted and the plunger 81 were balanced about its center of rotation, pressure regulation would be provided solely by the spring 94. The amount of fuel delivered to the injectors of the engine per cycle would decrease with increasing engine speed and consequently the torque would similarly decrease.

Since, in the actual construction, both the weight 93 and spring 94 are employed in the pressure regulator 80 to oppose the hydraulic pressure force exerted by the fuel in the cavity 66 acting on the differential area between the ends 89 and 88 of the plunger 81, the shape of the resultant torque curve will have a shape derived from the combination of these forces. Inasmuch as the force exerted by the weight 93 is infinitely variable, as contrasted to the force exerted by the spring 94, the selection of various weight-to-spring combinations permits shaping of the torque curve varying from one in which the curve rises generally with engine speed, such as would result when the force exerted by the spring 94 is slight or wholly absent and the weight alone acts, to a torque curve which decreases with increasing engine speed, such as would result when a very small weight 93 or none at all is employed and the spring alone acts, or a torque curve which rises with increasing engine speed to a predetermined maximum torque and then decreases at speeds above a predetermined speed such as would result when both the weight 93 and spring 94 are used.

Selection of the proportion of the force contributed by the weight 93 or spring 94 will permit shaping of the torque curve.

According to the present invention, the hub 72 also includes maximum speed governing means in the form of a maximum speed governor 120 (FIGS. 5 and 10) for restricting or substantially shutting off fuel flow from the cavity 66 to the remainder of the fuel passage in the unit and hence to the engine. The maximum speed governor 120 thus preferably comprises a plunger 121 which is somewhat loosely mounted in another bore 122 in the hub 72, the bore 122 being axially spaced from and extending transversely of the axis of rotation of the hub 72 at 90° to the bore for the plunger 81 and comprising another portion of the fuel passage through the unit. The plunger 121 extends through a somewhat larger bore 124 in the shaft 32 and coaxial with the bore 122, and includes a reduced diameter portion 126 defining an annular control portion or shoulder 127 therearound.

Fuel at controlled pressure in the cavity 66 enters the maximum speed governor 120 by means of one and preferably a pair of ducts in the form of a pair of spaced bores 128 (FIGS. 9 and 10) which extend transversely of the bore 122 and the axis of rotation of the hub 72. The bores 128 thus comprise another portion of the fuel passage and open into the transverse bore 122. From the bore 122 in the hub 72, fuel flows to the bore 124 in the shaft 32 and then flows through an axial bore 144 in the shaft 32, the bore 144 comprising another portion of the fuel passage leading to the engine.

The effective size of the openings of the bores 128 into the transverse bore 122 is varied by the position of the shoulder 127 as determined by the position of the plunger 121.

Movement of the plunger 121 in its bore 122 to cause the shoulder 127 to vary the size of the opening to restrict the flow of fuel to the engine when the latter reaches a predetermined maximum speed is effected by a weight 132 mounted on the left end of the plunger 121, as viewed in FIG. 10, and disposed in a counterbore 133 at said end. At speeds below maximum, the weight 132 is held by a coil spring 136 against a shoulder 134 defined by the inner end of the counterbore 133.

The coil spring 136 is disposed in a counterbore 137 in the end of the transverse bore 122 opposite the counterbore 133, and the outer end of the coil spring 136 bears against a retainer plate 138 secured on the outer end of the plunger 121 by a snap ring 141. The inner end of the coil spring 136 bears against a shoulder 142 at the inner end of the counterbore 137, and shims 143 may be inserted between the shoulder 142 and the inner end of the spring 136 to adjust the force exerted by the spring. Thus, the speed of rotation of the hub 72 and that of the engine at which the plunger 121 begins to shift in a direction to cause the shoulder 127 to restrict fuel flow in the bores 128 and transverse plunger bore 122 may be varied by changing the thickness or number of shims 143. It will be understood that different weights and springs having different rates could also be substituted.

Thus, when the engine is operating at speeds below its maximum set speed, the parts of the maximum speed governor 120 are in the position shown in FIG. 10. When the engine reaches its maximum speed, the centrifugal force exerted by the weight 132 overcomes the force exerted by the spring 136 and the plunger 121 moves to the left as viewed in FIG. 10 to reduce and eventually substantially close the openings of the passages 128 into the plunger bore 122. Under such conditions, substantially all the fuel supplied by the pump will be bypassed through the pressure regulator 80.

Lubrication of the various mechanical parts of the fuel supply apparatus and the associated fuel injectors of the engine during an overspeed condition when the plunger 121 has shifted to a position at which the shoulder 127 has completely moved across the inner ends of the transverse bore 128 is achieved by the loose fit of the plunger 121 in its bore 122. Such loose fit permits a small amount of fuel to leak between the plunger and its bore and thence downstream in the fuel passage to the injectors.

With the foregoing construction wherein the pressure regulator 80 and maximum speed governor 120 are mounted in the rotatable hub 72 and receive fuel under pressure from the cavity 66, several advantages are obtained. First, the customary flyball weights and their associated pivot pins are eliminated, thereby providing a more simplified construction having a more accurate response. Second, a more stable fuel regulation is achieved due to a reduction in the tendency for air bubbles to accumulate in the chambers or passages of the pressure regulator 80 and maximum speed governor 120. Third, the bypass flow through the pressure regulator 80 and the flow through the maximum speed governor 120 are in parallel flow relationship so that the pressure drop through the unit is reduced. Fourth, less power is required to drive the shaft 32 and hub 72 due to the internal location of the pressure regulator 80 and maximum speed governor 120 in the hub 72. Such location also contributes to the prevention of an excessive increase in the temperature of the fuel as it passes through the apparatus.

Assuming that the engine is operating at a set speed within its normal speed range and that the maximum speed governor 120 is not restricting the fuel flow, fuel at a regulated pressure in the cavity 66 will enter the coaxial bore 124 in the shaft 32 and then proceed axially outwardly through the central axial bore 144 (FIG. 5) in the shaft. Near the outer end of the bore 144, the fuel flows radially outwardly through a series of circumferentially spaced radial holes 146 (FIGS. 5 and 11) to a circumferential groove 147 in the shaft 32. From the groove 147 the fuel enters an annular chamber 148 of a throttle means 150 embodying features of the present invention.

As heretofore mentioned, the throttle means 150 is adapted to maintain the engine at a substantially constant speed when the engine is idling and to control the fuel flow to the engine throughout its operating range. The throttle means 150 (FIG. 11) preferably comprises a tubular sleeve member 152 mounted in a vertical bore 153 which extends vertically in the housing section 25 and intersects the bore 35 for the shaft 32 at the annular groove 147 in the shaft 32. The bore 153 includes a series of varying diameter portions engaged by a series of axially spaced annular flanges 156, 157 and 158 on the sleeve member 152. The flanges 156 to 158 may be provided with annular grooves therearound for receiving O-ring seals 159. The flanges 156 and 157 thus define the annular chamber 148, and the flanges 157 and 158 define another annular chamber 161. A cap 162 is threaded into the upper end of the bore 153 to close the latter.

A plunger 163 is shiftably mounted in the bore, indicated at 164, of the sleeve member 152 for controlling the flow of fuel through the unit and to the engine throughout the operating range thereof. To this end, the plunger 163 includes a reduced diameter portion 166 defining a chamfered shoulder 167 which coacts with a plurality of circumferentially spaced radially aligned holes 168 in the sleeve member 152 for controlling the flow of fuel to the chamber 161. The sleeve 152 includes another series of circumferentially spaced holes 172 which connect the annular chamber 148 with an annular space 173 defined by the reduced diameter portion 166 and the sleeve bore 164. Thus, when the shoulder 167 of the plunger 163 is in a position to provide communication between the annular space 173 and the holes 168 in the sleeve member 152, fuel from the annular groove 147 in the shaft 32 may flow into the annular chamber 148, through the holes 172 into the annular space 173 and thence through the holes 168 into the annular chamber 161.

From the chamber 161 the fuel flows through an axial bore 174 which is in front of the plane of FIG. 11 and therefore indicated in dot-dash lines in FIG. 11 and in full lines in FIG. 12, and which communicates with a shutdown valve assembly 175 (FIGS. 1, 3, 4 and 5) hereinafter described.

As heretofore mentioned, the throttle means 150 is adapted to maintain the engine at a substantially constant-idle speed as well as to control the flow of fuel to the engine throughout its operating range. For maintaining the engine at idle speed, the upper end of the plunger 163 is threaded to receive an adjustable means in the form of a nut 176 serving as an adjustable abutment against which the upper end of a coil spring 177 bears. The lower end of the coil spring 177 seats on the upper end face of the sleeve member 152. Thus, the coil spring 177, which is normally under compression, acts on the plunger and tends to urge the latter upwardly or in a direction to increase fuel flow through the opening 168 to the engine. The force of the coil spring 177 is opposed by the pressure of the fuel upstream of the plunger 163, which pressure is supplied to a chamber 178 defined by the cap 162, the pressure acting on the upper end of the plunger. Specifically, the pressure of the fuel in the chamber 178 is the same as that in the cavity 66 and is communicated to the chamber 178 by a duct in the form of a diagonal bore 182 in the housing section 25, indicated in dotted lines in FIGS. 1, 4 and 11, extending from the cavity 66 to the chamber 178.

Thus, during idle, the position of the plunger 163 and consequently the fuel flow to the engine will vary in accordance with pressure variations in the chamber 178, which will be the same as in the cavity 66. Assuming that the idle adjusting nut 176 has been adjusted on the throttle plunger 163 to provide a desired idle speed, the pressure in the chamber 178 will shift the plunger 163 downwardly in its bore 164 until the spring 177 is compressed sufficiently to balance the fuel pressure force. The shoulder 167 will thus restrict the openings 168 by an amount such as will maintain the desired idle fuel flow and engine speed. If the idle speed should drop for any reason, the pressure in the cavity 66 and likewise in the chamber 178 will also drop. The spring 177 will then raise the plunger 163 to a new equilibrium position which will permit a greater amount of fuel to flow to the engine and thus return it to the desired idle speed. Conversely, if the idle speed of the engine should increase for any reason, the pressure of the fuel in the cavity 66 and likewise in the chamber 178 will increase.

The plunger 163 will then be shifted downwardly in its bore causing the shoulder 167 to further restrict the size of the openings 168 and the fuel flow to the engine. Consequently, the engine will be maintained at the desired idle speed.

For controlling the flow of fuel to the engine at speeds above idle, a throttle control member in the form of a manually shiftable throttle shaft 186 is provided. The throttle shaft 186, in the present instance, is rotatably mounted in a transverse bore 187 in the housing section 25, perpendicular to the plunger 163, and is provided with a flat 188 which underlies the lower end, indicated at 189, of the throttle plunger 163. When the throttle shaft 186 is rotated to its idle position as illustrated in FIG. 11, the flat 188 is horizontal, or substantially so, and does not contact the lower end 189 of the plunger.

When it is desired to increase the flow of fuel to the engine to that needed for operation above idle, the throttle shaft 186 is rotated as for example by a lever 192 (FIGS. 1, 4 and 11), which is controlled through linkage (not shown) by the driver of the vehicle. Starting from its idle position, i.e., where the flat 188 of the throttle shaft 186 is horizontal, rotation of the lever 192 in a counterclockwise direction causes the flat 188 to engage the lower end 189 of the plunger 163 and shift the latter upwardly to provide any desired fuel flow to the engine. Thus, when the throttle shaft 186 is rotated from its idle position, it overrides the force of the fuel pressure in the chamber 178 and shifts the plunger 163 upwardly. Such pressure, however, continues to act on the plunger 163 and thus maintains the lower end 189 thereof in engagement with the flat 188. If, for any reason, the speed of the engine reaches its predetermined maximum speed even though the throttle shaft 186 has not been rotated to its full throttle position, the governor 120 will restrict the fuel passage upstream thereof and shut off fuel flow to the engine.

In FIGS. 13 to 16, inclusive, the position of the plunger 163 and flat 188 of the throttle means 150 are illustrated for various operating conditions of the engine. Thus, FIG. 13 illustrates the position that the plunger 163 and shoulder 167 thereof would approximately occupy with respect to the outlet openings 168 when the engine is shut down and the throttle shaft 186 has been rotated to its idle position. In this condition, fuel in the cavity 66 and consequently in the chamber 178 is not under pressure and thus the spring 177 has urged the plunger 163 to its uppermost position. The control shoulder 167 is also in a position whereby the openings 168 are the least restricted.

FIG. 14 illustrates the approximate position of the plunger 163 with respect to the openings 168 in the sleeve member 152, and the position of the flat 188 when the engine is operating at idle speed. It will be noted that the lower end 189 of the plunger 163 is not in contact with the flat 188 on the throttle shaft 186 and that the plunger 163 has moved downwardly in the sleeve member 152 due to the pressure of the fuel in the chamber 178 acting on the upper end of the plunger. The chamfered shoulder 167 of the plunger is thus controlling fuel flow through the openings 168 to maintain the engine at a substantially constant idle speed, and the plunger is free to move solely under the effect of the fuel pressure in chamber 178 and the spring 177.

FIG. 15 illustrates the position of the plunger 163 when the throttle shaft 186 has been manually rotated to an intermediate setting and the flat 188 has cammed the plunger 163 upwardly. Thus, throughout the intermediate operating range of the engine, the position of the plunger 163 and the shoulder 167 thereof with respect to the openings 168 is determined by the rotated position of the throttle shaft 186, and the pressure of the fuel in the chamber 178 holds the plunger 163 in contact with the flat 188 on the throttle shaft 186.

FIG. 16 illustrates the position of the plunger 163 and throttle shaft 186 during an overspeed condition. Thus, assume that the engine has reached or exceeded its predetermined maximum speed and the driver of the vehicle has manually shifted the throttle linkage so that the throttle shaft 186 and the flat 188 thereof are at an idle position. Such position is determined by a throttle leakage adjustment screw 193 (FIGS. 1, 3 and 4) which is threaded into the housing section 25 and accessible from the exterior thereof. The throttle shaft 186 is provided with a stop pin 194 (FIG. 11) so that the inner end of the screw 193 is in the path of the upper end of the pin 194. Thus, when the throttle shaft 186 is rotated to its idle position, the pin 194 engages the screw 193. Hence, the extent to which the shoulder 167 moves past the lower margin of the openings 168 in the sleeve 152 during an overspeed condition, and thus the amount of fuel which may flow through the clearance space between that portion of the plunger 163 below the openings 168 and its bore, is determined by the position of the screw 193. Such clearance space results from the loose fit of the plunger 163 in its bore, as previously mentioned. Leakage flow through the maximum speed governor 120 during an overspeed condition results from a similar size relationship between the diameter of the governor plunger 121 and its bore 122, as previously described.

The maximum speed position of the throttle shaft 186 and consequently the position of the shoulder 167 on the plunger 163 which provides the least amount of restriction of the openings 168 is also adjustable by means of another screw 196 spaced from the screw 193. The screw 196 is threaded into the housing section 25 and is thus adjustable from the exterior thereof. The inner end of the screw 196 engages the lower end of the pin 194 when the throttle shaft 186 is rotated to its full throttle position.

As heretofore mentioned, a controlled flow of fuel at a controlled pressure enters the axial bore 174 (FIGS. 11 and 12) from the throttle means and then enters a generally annular recess 197 in the outer end face, indicated at 198, of the housing section 25. Mounted in a counterbored portion 199 of the recess 197 is a valve plate or disk 201 of a material having a high magnetic permeability comprising a portion of the shutdown valve assembly 175. An annular axially extending boss 204 (FIGS. 5 and 12) is provided in the recess 197 and the valve disk 201 is normally urged axially inwardly into pressure sealed engagement with the end face of the boss 204 by an annular dished spring 206 carried on the outer side of the plate 201. The boss 204 circumscribes an axial bore 207 in the housing section 25, the bore 207 comprising another portion of the fuel passage through the unit downstream of the assembly 175. The inner face of the valve disk 201 may be annularly recessed to receive an annular gasket 208.

Fuel under pressure in the annular recess 197 may thus flow radially inwardly over the edge of the boss 204 when the valve plate 201 is unseated. Movement of the valve plate 201 away from the end face of the boss 204 is effected by an electromagnet which includes a core 213 and a coil 214. In the present instance, the core 213 and coil 214 are mounted in a housing 216 which also conducts magnetic flux and which is secured to the end face 198 of the housing section 25. The housing 216 may be filled with a suitable potting compound 215 to prevent damage to coil 214 due to vibration. Current is supplied to the coil 214 of the electromagnet through terminal screws 217 and 218. A shield 219 is placed on the inner face of the potting compound 215 to provide an abutment for the spring 206 and to prevent the fuel from seeping into the potting compound.

Thus, when the electromagnet of the shutdown valve 175 is energized, the valve plate 201 is drawn toward the core 213 to permit fuel in the recess 197 to flow radially inwardly over the edge of the boss 204 and into the bore 207. From the bore 207, the fuel flows upwardly in a connecting vertical bore 222 (see FIGS. 5 and 12) and thence through an outlet fitting 223 threaded into the upper end of the bore 222 and connected to the engine. Alternately, the upper end of the bore 222 may be plugged and the fitting 223 threaded into the outer end of a horizontal bore 224 (FIGS. 5 and 12), the inner end of which intersects the vertical bore 222.

In the event of an electrical failure, it is desirable to be able to manually open the shutdown valve assembly 175 to permit fuel flow to the injectors and operation of the engine. To this end, the housing section 25 is provided with a vertical bore 226 (FIG. 12) in which a shaft 227 is rotatably mounted. The upper end of the shaft 227 is provided with a plate-like handle or operating lever 228 (FIGS. 4, 5 and 12) and the lower end of the shaft 227 extends into the recess 197 and is provided with a flattened portion 232 for engaging the inner side of the valve disk 201. Thus, when the lever 228 is swung away from the housing 21 or in the direction of the arrow thereon, the flattened portion 232 cams the valve plate 201 to a partially open position so that the engine may be operated.

Lubrication of the various internal bearing surfaces of the fuel supply apparatus is achieved by a lubricating fuel flow from the pump 40. Thus, a small quantity of fuel under pressure from the pump 40 flows axially along the journals of the shaft 32 in the housing sections 23 and 24 to lubricate this portion of the shaft. Fuel flowing rearwardly, or to the right as shown in FIG. 5, flows along the shaft to the annular recess 107 which is part of the bypass of the pressure regulator 80 and through which fuel is returned to the intake side of the pump 40. Fuel flowing forwardly or toward the left end of the pump as viewed in FIG. 5 is prevented from leaking out of the outer end face of the housing section 23 by a pair of seals 236 mounted in a counterbore 237 in the outer end of the shaft bore 33. The inner seal 236 is spaced from the inner end wall of the counterbore 237 and defines an annular chamber 238 therebetween for receiving the lubricating flow of fuel leaking outwardly along the journal of the shaft 32 in the housing section 23.

After entering the chamber 238, the lubricating flow of fuel proceeds diagonally upwardly and inwardly through a bore 239 in the housing section 23 toward a recess 242 in the end face 54 of the housing section 24. From the recess 242, the lubricating fuel flow proceeds inwardly through an axially extending bore 243 in the housing section 24 to a connected substantially axially extending bore 244 (FIGS. 5 and 10) in the housing section 25. The right end of the bore 244 intersects a vertically extending bore 246, the upper end of which is threaded to receive a fitting 247. The fitting 247 is connected by conduits (not shown) with the fuel tank or reservoir of the engine.

Fuel under pressure in the cavity 66 fills the interior of the stub shaft 44 and a chamber at each end thereof for lubricating the journals of the stub shaft in its bearing bores 47 and 48. Fuel under pressure in the cavity 66 also works its way between the right end face of the hub 72 and the adjacent face, indicated at 248 in FIG. 5, of the cavity 66 to lubricate this interface. Lubricating fuel flows radially inwardly across the face 248 and thence proceeds axially toward the right along the shaft bore 35 toward an annular groove 249 in the shaft 32. The groove 249 communicates with the vertical bore 246 through an intersection of the latter, indicated at 251, with the shaft bore 35.

The portions of the shaft 32 on each side of the annular groove 147 are lubricated by fuel under pressure in the groove, which works its way along the shaft. Thus, a lubricating flow of fuel proceeds axially to the left from the groove 147 toward the groove 249 to lubricate that portion of the shaft 32 therebetween, and another lubricating flow of fuel from the groove 147 proceeds axially to the right from the groove 147 toward the outer end of the shaft 32 to lubricate this portion of the shaft journal. The latter lubricating flow enters a chamber or space 252 at the right end of the shaft 32 as viewed in FIG. 5. A bore 255 extends inwardly or to the left from the right end face 198 of the housing section 25, and the bore 255 intersects the chamber 252.

A pair of tachometer drive gears 253 and 254 are located in the chamber 252 and bore 255 to mesh with each other, these gears being lubricated by fuel from the chamber 252. The gear 253 includes a plug portion 256 which is pressed into the outer or right end of the bore 144 in the shaft 32, and the gear 254 is secured to the inner tubular end of a tachometer drive shaft 257. The shaft 257 is rotatably journaled in a bearing block 258, the latter being retained in the bore 255 by a tachometer housing 263, the shaft 257 extending through the housing 263. Thus, fuel under pressure in the bore 255 flows radially inwardly to lubricate the interface between the tachometer gear 254 and bearing 258 and then proceeds axially outwardly to lubricate that portion of the shaft 257 in the bearing 258. Such flow empties into an annular chamber 264 between the outer face of the bearing 258 and an annular seal 266 mounted in the housing 263.

From the chamber 264, the lubricating fuel flow enters the outer ends of a radial bore 265 in the tubular portion of the shaft 257 and then proceeds axially inwardly through the tubular portion of the shaft 257 to enter a coaxial bore 267 (FIGS. 5 and 11). The inner end of the bore 267 intersects the lower end of the bore 246, as at 268. Such flow then proceeds upwardly in the bore 246 for return to the fuel tank or reservoir.

Lubrication of the journals of the throttle shaft 186 is achieved by the fuel in the bore 267 which intersects the bore 187 in which the shaft 186 is mounted. To this end, the bore 187 is enlarged as at 272 (FIG. 11) to provide an annular chamber 273 around the shaft 186, from which fuel may proceed axially outwardly to lubricate the shaft journals. The chamber 273 also receives lubricating fuel flowing downwardly in the clearance space between the lower end of the plunger 163 and its bore 164.

From the foregoing description, it will be apparent that a novel fuel supply apparatus has been provided for accurately controlling the flow of fuel to the injectors of an internal combustion engine of the diesel type. The pressure regulating means 80, the maximum speed governing means 120, and the idle speed governing or throttle means 150 are separately mounted in the fuel supply apparatus and are individually adjustable. The pressure regulating means 80 and the maximum speed governing means 120 are controlled by centrifugal forces but the forces are derived from means independent of each other and do not utilize conventional flyball weights with their attendant problems because of the mounting of the weights. The fuel supply apparatus requires a minimum of power to drive it and is capable of operation at high engine speeds and does not excessively heat the fuel passing through it. The apparatus is compact in size, light in weight, and has a reduced number of parts. Further, the apparatus is simple in construction, easy to adjust and service in the field, and reliable in operation.

We claim:

1. In a fuel supply apparatus for an internal combustion engine having throttle means, a housing having a passage therethrough adapted to be connected at one end to the engine for supplying fuel thereto, an engine driven pump connected to the other end of said passage for supplying fuel thereto, an engine driven member rotatably mounted in said housing and having a bore therein connected to said passage to receive fuel from said passage, said member and said housing having a bypass connecting said bore with the intake side of said pump, and pressure regulating means mounted in said bore and responsive to opposing forces thereon derived from the speed of rotation of said member and from the pressure of the fuel in said passage for determining the rate of flow of fuel through said bypass and thereby the pressure of the fuel in said passage supplied to said throttle means of the engine.

2. The combination of claim 1, in which said pump is mounted in said housing and is driven by said engine driven member.

3. The combination of claim 1, in which said bore extends transversely of the axis of rotation of said member, and said pressure regulating means comprises a plunger mounted in said bore for radial movement relative to said member, said plunger being movable by the centrifugal force thereof on rotation of said member and by the pressure of the fuel in said passage to vary the effective size of the connection between said passage and said bore.

4. The combination of claim 3, in which the centrifugal force of said plunger acts thereon in one direction tending to cause movement of said plunger to reduce the effective size of said connection, and the pressure of the fuel in said passage acts on said plunger in the opposite direction to cause movement of said plunger to increase the effective size of said connection.

5. The combination of claim 4, in which said pressure regulating means includes a spring acting on said plunger in opposition to the pressure of the fuel in said passage.

6. The combination of claim 4, in which said member comprises a shaft having a hub thereon and said bore extends transversely through said shaft and said hub, said bore and said plunger at one side of the axis of rotation of said member being larger than said bore and said plunger at the other side of said axis, said plunger at its opposite ends being subjected to the pressure of the fuel in said passage whereby the force tending to move said plunger is proportional to the difference in size of said ends, a weight is mounted on the larger end of said plunger, and a spring is provided for urging said plunger in the direction of the centrifugal force of said weight.

7. The combination of claim 6, in which said hub has at least one duct extending transversely therethrough and opening into said bore in the smaller portion thereof, and said plunger has a reduced portion movable into registry with said duct for permitting fuel to flow from said duct to said bypass.

8. The combination of claim 7, in which a pair of said ducts are provided in said hub, and said ducts intersect opposite sides of said bore and the reduced portion of said plunger is movable into registry with said ducts to permit flow of fuel to said bypass.

9. The combination of claim 2, in which said housing has a duct adapted to be connected to a source of fuel and leading to said pump, said bypass comprises a pair of passages extending diagonally from said bore through said member to the exterior thereof, and said housing has an annular space around said member registering with said pair of passages, said annular space communicating with said duct.

10. The combination of claim 3, in which damping means is mounted in said member for damping the movement of said plunger.

11. The combination of claim 6, in which orifice means is provided in the smaller end of said bore between said passage and the smaller end of said plunger to apply pressure to the smaller end of said plunger, said orifice means damping the movement of said plunger.

12. The combination of claim 1 in which said engine driven member has a second bore therein comprising a portion of said passage, and maximum speed governing means mounted in said second bore and responsive to the speed of rotation of said member for restricting the flow of fuel through said portion when said engine and said member reach a predetermined maximum speed of rotation.

13. The combination of claim 12, in which said second bore extends transversely of the axis of rotation of said member, and said maximum speed governing means comprises a plunger mounted in said second bore for radial movement relative to said member, said plunger being movable by centrifugal force when said member reaches said predetermined maximum speed of rotation to restrict said portion.

14. The combination of claim 13, in which said member comprises a shaft having a hub thereon and said second bore extends transversely through said shaft and said hub, a weight is mounted on one end of said plunger for increasing the centrifugal force acting on said plunger, and a spring is provided for urging said plunger in the opposite direction from that of said centrifugal force.

15. The combination of claim 14, in which said hub includes at least one duct extending transversely of said second bore and opening into said second bore, said duct comprises a portion of said fuel passage, and said plunger includes a control portion movable to vary the size of said opening of said duct into said second bore for restricting the flow of fuel therethrough when said engine and said hub reach a predetermined maximum speed of rotation.

16. The combination of claim 15, in which said plunger is smaller than said second bore to provide a clearance therebetween said clearance permitting a small amount of fuel to flow through said passage when said control portion closes said opening of said duct.

17. In a fuel supply apparatus for an internal combustion engine, a housing having a passage therethrough adapted to be connected at one end to the engine for supplying fuel thereto, an engine driven pump connected to the other end of said passage for supplying fuel thereto, pressure regulating means responsive to opposing forces thereon derived from the speed of rotation of said engine and from the pressure of the fuel in said passage for determining the pressure of the fuel therein, and throttle means comprising a plunger reciprocably mounted in said housing for controlling the pressure of the fuel downstream of said plunger and hence the flow of fuel through said passage to the engine, sand housing having a duct for applying the regulated pressure of the fuel in said passage upstream of said plunger to said plunger for urging the latter in one direction, and spring means acting on said plunger for urging the latter in the opposite direction, whereby said spring means and said fuel pressure coact on said plunger to vary the position of said plunger and thereby control the pressure of the fuel downstream of said plunger and hence the flow of fuel to the engine to maintain the engine at a substantially constant speed.

18. The combination of claim 17, in which the pressure of the fuel in said duct tends to cause movement of said plunger in a direction to decrease the pressure and hence the flow of fuel to the engine, and said spring means acts on said plunger tending to cause movement thereof in a direction to increase the flow of fuel to the engine.

19. The combination of claim 17, in which said plunger includes a control portion coacting with said passage to control the pressure and hence the fuel flow to the engine, said spring means and the pressure of the fuel in said duct acting on said plunger on a different portion thereof.

20. In a fuel supply apparatus for an internal combustion engine, a housing having a passage therethrough adapted to be connected at one end to the engine for supplying fuel thereto, an engine driven pump connected to the other end of said passage for supplying fuel thereto, pressure regulating means responsive to opposing forces thereon derived from the speed of rotation of said engine and from the pressure of the fuel in said passage for determining the pressure of the fuel therein, and throttle means comprising a plunger reciprocably mounted in said housing for varying the pressure of the fuel downstream of said plunger and hence the flow of fuel through said passage to the engine, said housing also having a chamber communicating with said passage for receiving fuel under regulated pressure from said passage upstream of said plunger, said plunger extending into said chamber so that the pressure of the fuel in said chamber acts on said plunger and tends to cause movement thereof in a direction to decrease the flow of fuel to the engine, and spring means in said chamber acting on said plunger and tending to cause movement thereof in a direction to increase the flow of fuel to the engine, said spring means and the pressure of the fuel in said chamber coacting on said plunger to vary the position of said plunger and thereby control the pressure of the fuel downstream of said plunger and hence the flow of fuel to the engine to maintain said engine at a substantially constant idle speed.

21. The combination of claim 20, in which adjustable means is mounted on said plunger in said chamber for varying the pressure exerted by said spring means on said plunger, whereby adjustment of the position of said adjustable means is effective to adjust the idle speed of said engine.

22. In a fuel supply apparatus for an internal combustion engine, a housing having a passage therethrough adapted to be connected at one end to the engine for supplying fuel thereto, an engine driven pump connected to the other end of said passage for supplying fuel thereto, said housing also having a bore therein, pressure regulating means responsive to opposing forces thereon derived from the speed of rotation of said engine and from the pressure of the fuel in said passage for determining the pressure of the fuel therein, an elongated engine driven member rotatably mounted in said bore and having an axial duct therein comprising a portion of said fuel passage, said engine driven member having a reduced portion therearound and at least one radial opening connecting said axial duct with said reduced portion, said housing also having a plunger bore therein extending perpendicular to and alongside said first-mentioned bore and intersecting the same at said reduced portion of said engine driven member, a portion of said plunger bore comprising a portion of said passage, and a plunger reciprocably mounted in said plunger bore and movable in response to variations in the regulated pressure of the fuel in said passage upstream of said plunger for varying the pressure of the fuel downstream of said plunger and hence the flow of fuel to the engine to maintain the engine at a substantially constant idle speed.

23. In a fuel supply apparatus for an internal combustion engine, a housing having a passage therethrough adapted to be connected at one end to the engine for supplying fuel thereto, an engine driven pump connected to the other end of said passage for supplying fuel thereto, pressure regulating means responsive to opposing forces thereon derived from the speed of rotation of said engine and from the pressure of the fuel in said passage for determining the pressure of the fuel therein, and throttle means comprising a plunger reciprocably mounted in said housing for controlling the flow of fuel through said passage to the engine, said housing having a duct for applying the regulated pressure of the fuel in said passage upstream of said plunger to said plunger for urging the latter in a direction to decrease the flow of fuel to said engine, spring means acting on said plunger for urging the latter in a direction to increase the flow of fuel to said engine, and a throttle control member shiftably mounted in said housing and having a portion engageable with said plunger for moving the latter in a direction to increase flow of fuel to said engine at speeds above idle, said spring means holding said plunger out of engagement with said portion of said throttle control member when the latter is in idle position whereby said throttle control member is ineffective to control the pressure and hence the flow of fuel to said engine at idle speed and the movement of said plunger is controlled solely by the pressure of the fuel on said plunger and by said spring means, the pressure of the fuel on said plunger holding said plunger in engagement with said portion of said throttle control member when the latter is positioned for speeds above idle.

24. In a fuel supply apparatus for an internal combustion engine, a housing having a passage therethrough adapted to be connected at one end to the engine for supplying fuel thereto, an engine driven pump connected to the other end of said passage for supplying fuel thereto, pressure regulating means responsive to opposing forces thereon derived from the speed of rotation of said engine and from the pressure of the fuel in said passage for determining the pressure of the fuel therein, throttle means comprising a plunger reciprocably mounted in said housing for controlling the pressure of the fuel downstream of said plunger and hence the flow of fuel through said passage to the engine, said housing having a duct for applying the regulated pressure of the fuel in said passage upstream of said plunger to said plunger for urging the latter in a direction to decrease the flow of fuel to said engine, and a throttle control member having a portion engageable with said plunger for varying the position thereof and the flow of fuel to said engine at speeds above idle, the pressure of the fuel in said passage upstream of said plunger holding the latter in engagement with said portion of said throttle control member when the latter is positioned for speeds above idle.

25. The combination of claim 24, in which said plunger includes a control portion intermediate the ends thereof and coacting with said passage to control fuel flow to the engine, the regulated pressure of the fuel in said fuel passage acts on one end of said plunger, and said portion of said throttle control member engages the other end of said plunger.

26. The combination of claim 24, in which said throttle control member comprises a shaft rotatably mounted in said housing, and said portion of said throttle control member comprises a flat surface on said shaft, the axis of said shaft extending perpendicular to said plunger.

27. In a fuel supply apparatus for an internal combustion engine, a housing having a bore therein and a passage therethrough adapted to be connected at one end to the engine for supplying fuel thereto, engine driven pump means connected to the other end of said passage for supplying fuel thereto, pressure regulating means responsive to opposing forces thereon derived from the speed of rotation of said engine and from the pressure of the fuel in said passage for determining the pressure of the fuel therein, and throttle means comprising a plunger reciprocably mounted in said housing bore for controlling the pressure of the fuel downstream of said plunger and hence the flow of fuel through said passage to the engine, said housing having a duct for applying the regulated pressure of the fuel in said passage upstream of said plunger to said plunger, and a throttle control member for varying the position of said plunger in said housing bore and the flow of fuel to said engine when said engine is operating at speeds above idle, said plunger having a clearance in said bore to permit a small quantity of fuel to flow to said engine when the latter is operating at speeds above idle and said throttle control member is in an idle position and said plunger is in a position in said housing bore to close off the normal flow of fuel through said passage.

28. In a fuel supply apparatus for an internal combustion engine, a housing having a passage therethrough adapted to be connected at one end to the engine for supplying fuel thereto, an engine driven pump connected to the other end of said passage for supplying fuel thereto, an engine driven member rotatably mounted in said housing and having a first bore therein connected to said passage for receiving fuel therefrom, said member and said housing having a bypass connecting said bore with said pump, pressure regulating means mounted in said first bore and responsive to the speed of rotation of said member and the pressure of the fuel in said passage for controlling the flow of fuel through said bypass and thereby the pressure of the fuel supplied to the engine, said engine driven member also having a second bore therein comprising a portion of said passage, and maximum speed governing means mounted in said second bore and responsive to the speed of rotation of said member for restricting the flow of fuel through said portion when said engine and said member reach a predetermined maximum speed of rotation, said maximum speed governing means, when so restricting the flow of fuel, causing substantially all of the fuel from said pump to flow through said bypass.

29. The combination of claim 28, in which said pressure regulating means is connected to said passage upstream of said second bore.

30. The combination of claim 28, in which said first and second bores extend transversely of the axis of rotation of said member and perpendicularly to each other.

31. The combination of claim 28, in which said pressure regulating means and said maximum speed governing means comprise a pair of plungers respectively mounted in said first and second bores for radial movement relative to said member.

32. In a fuel supply apparatus for an internal combustion engine, a housing having a passage therethrough and a cavity therein comprising a portion of said passage, said passage being adapted to be connected at one end to said engine for supplying fuel thereto, an engine driven pump connected to the other end of said passage for supplying fuel thereto, an engine driven shaft rotatably mounted in said housing and extending through said cavity and having a hub disposed in said cavity, said hub and said shaft having first and second bores therein extending transversely of the axis of rotation of said shaft, said shaft and said housing having a bypass connecting said first bore with said pump, said hub including at least one duct extending transversely therethrough and connecting said cavity with said first bore, pressure regulating means mounted in said first bore and responsive to the speed of rotation of said member and the pressure of the fuel in said cavity for controlling the flow of fuel through said bypass and thereby the pressure of the fuel supplied to said engine, maximum speed governing means mounted in said second bore for restricting the flow of fuel to said engine when said engine and said hub reach a predetermined maximum speed of rotation, said hub having at least one other duct extending transversely therethrough and opening into said second bore to connect the latter with said cavity, whereby said pressure regulating means and said maximum speed governing means are surrounded by and receive fuel under pressure from said cavity.

33. In a fuel supply apparatus for an internal combustion engine, a housing having a passage therethrough adapted to be connected at one end to the engine for supplying fuel thereto, an engine driven pump connected to the other end of said passage for supplying fuel thereto, an engine driven member rotatably mounted in said housing and having a bore therein connected to said passage to receive fuel from said passage, said member and said housing having a bypass connecting said bore with the intake side of said pump, pressure regulating means mounted in said bore and responsive to opposing forces thereon derived from the speed of rotation of said member and from the pressure of the fuel in said passage for determining the rate of flow of fuel through said bypass and thereby the pressure of the fuel in said passage, throttle means comprising a plunger reciprocably mounted in said housing for controlling the flow of fuel from said passage to the engine, said housing having a duct for applying the pressure of the fuel in said passage upstream of said plunger to said plunger for urging the latter in one direction, and spring means acting on said plunger for urging the latter in the opposite direction, said spring means and said fuel pressure coacting to vary the position of said plunger and the flow of fuel to the engine, said pressure regulating means being effective to control the pressure of the fuel applied to said plunger and the pressure of the fuel supplied to said engine, and said plunger being effective to control the flow of fuel to the engine.

34. In a fuel supply apparatus for an internal combustion engine, a housing having a passage therethrough adapted to be connected at one end to the engine for supplying fuel thereto, an engine driven pump connected to the other end of said passage for supplying fuel thereto, an engine driven member rotatably mounted in said housing and having a bore therein connected to said passage to receive fuel from said passage, said member and said housing having a bypass connection said bore with the intake side of said pump, pressure regulating means mounted in said bore and responsive to opposing forces thereon derived from the speed of rotation of said member and from the pressure of the fuel in said passage for determining the rate of flow of fuel through said bypass and thereby the pressure of the fuel in said passage, throttle means comprising a plunger reciprocably mounted in said housing for controlling the flow of fuel from said passage to the engine, and a throttle control member shiftably mounted in said housing and having a portion engageable with said plunger for moving the latter in a direction to increase the flow of fuel to said engine, said housing having a duct for applying the pressure of the fuel in said passage upstream of said plunger to said plunger for urging the latter in the opposite direction to hold said plunger in engagement with said portion of said throttle control member.

35. In a fuel supply apparatus for an internal combustion engine, a housing having a passage therethrough adapted to be connected at one end to the engine for supplying fuel thereto, an engine driven pump connected to the other end of said passage for supplying fuel thereto, an engine driven member rotatably mounted in said housing and having a first bore therein comprising a portion of said passage, throttle means comprising a plunger reciprocably mounted in a bore in said housing for controlling the flow of fuel through said portion of said passage to the engine, said housing having a duct for applying the pressure of the fuel in said passage upstream of said plunger to said plunger and a throttle control member having a portion engageable with said plunger for varying the position thereof and the flow of fuel to said engine, the pressure of the fuel applied to said plunger holding the latter in engagement with said portion of said throttle control member in the range of speeds above idle, and maximum speed governing means mounted in said first bore and responsive to the speed of rotation of said member for restricting the flow of fuel through said portion when said engine and said member reach a predetermined maximum speed of rotation, said plunger and said maximum speed governing means permitting a small quantity of fuel to flow to said engine when the latter reaches said predetermined maximum speed of rotation.

36. The combination of claim 35, in which said maximum speed governing means comprises a plunger mounted in said first bore, and said plunger loosely fits said first bore to provide a clearance therebetween, said clearance permitting said small quantity of fuel to flow to said engine when the latter reaches said predetermined maximum speed of rotation.

37. In a fuel supply apparatus for an internal combustion engine having throttle means, a housing having a passage therethrough adapted to be connected at one end to the engine for supplying fuel thereto, an engine driven pump connected to the other end of said passage for supplying fuel thereto, said housing having a cavity forming part of said passage, an engine driven member rotatably mounted in said housing, adjustable pressure regulating means mounted in said member and located in said cavity and responsive to opposing forces thereon derived from the speed of rotation of said member and from the pressure of the fuel in said passage for determining the pressure of the fuel in said passage, adjustable maximum speed governing means mounted in said member and located in said cavity and spaced from said pressure regulating means, said maximum speed governing means being responsive to the speed of rotation of said member for restricting the flow of fuel from said cavity to the engine throttle means when the engine and said member reach a predetermined maximum speed of rotation, said throttle means being adjustable in said housing for controlling the flow of fuel from said governing means to the engine, whereby said pressure regulating means, said maximum speed governing means, and said throttle means are separate from each other and are independently adjustable.

References Cited
UNITED STATES PATENTS

| | | | |
|---|---|---|---|
| 3,289,590 | 12/1966 | Hutcheon | 103—2.1 |
| 3,159,152 | 12/1964 | Reiners | 123—140 |
| 3,243,957 | 4/1966 | Mansfield et al. | 60—39.28 |

LAURENCE M. GOODRIDGE, *Primary Examiner.*